(12) United States Patent
Quetschke et al.

(10) Patent No.: US 8,279,511 B2
(45) Date of Patent: Oct. 2, 2012

(54) METHOD AND APPARATUS FOR MODULATING LIGHT

(75) Inventors: Volker M. Quetschke, Brownsville, TX (US); Wan Wu, Yorktown, VA (US); Luke Williams, Gainesville, FL (US); Muzammil A. Arain, Gainesville, FL (US); Rodica Martin, Gainesville, FL (US); David Reitze, Gainesville, FL (US); David B. Tanner, Gainesville, FL (US); Guido Mueller, Newberry, FL (US)

(73) Assignee: University of Florida Research Foundation, Inc., Gainseville, FL (US)

( * ) Notice: Subject to any disclaimer, the term of this patent is extended or adjusted under 35 U.S.C. 154(b) by 1 day.

(21) Appl. No.: 12/996,695

(22) PCT Filed: Jul. 13, 2009

(86) PCT No.: PCT/US2009/050417
§ 371 (c)(1),
(2), (4) Date: Dec. 7, 2010

(87) PCT Pub. No.: WO2010/006337
PCT Pub. Date: Jan. 14, 2010

(65) Prior Publication Data
US 2011/0164302 A1    Jul. 7, 2011

Related U.S. Application Data

(60) Provisional application No. 61/080,129, filed on Jul. 11, 2008.

(51) Int. Cl.
*G02F 1/03* (2006.01)
(52) U.S. Cl. ........................................ 359/254; 359/256
(58) Field of Classification Search ................... 359/251, 359/254, 256
See application file for complete search history.

(56) References Cited

U.S. PATENT DOCUMENTS

| | | | |
|---|---|---|---|
| 4,932,737 A | 6/1990 | Yoon et al. | |
| 5,831,759 A | 11/1998 | Debesis et al. | |
| 5,841,500 A | 11/1998 | Patel | |
| 5,978,125 A * | 11/1999 | Yao | ............... 359/256 |
| 6,567,203 B1 | 5/2003 | Hill et al. | |
| 7,035,484 B2 | 4/2006 | Silberberg et al. | |

FOREIGN PATENT DOCUMENTS

JP    08-227080 A    10/1998

OTHER PUBLICATIONS

Quetschke, V., "Electro Optic Modulators and Modulation for Enhanced LIGO and Beyond," Jul. 2008, Optical Society of America, 2008 Summer Optics and Photonics Congress, Boston, MA.

* cited by examiner

*Primary Examiner* — William Choi
(74) *Attorney, Agent, or Firm* — Saliwanchik, Lloyd & Eisenschenk

(57) ABSTRACT

Embodiments relate to a method and apparatus for producing polarized light, having a modulator crystal, where the modulator crystal incorporates a birefringent electro- optic material. The modulator crystal has an optic axis, a first polarization axis, and a second polarization axis, where the first polarization axis and second polarization axis are each perpendicular to the optic axis and perpendicular to each other. The apparatus can also include an electrode pair, where application of an electric field modulates light passing through the modulator crystal that is polarized along the first polarization axis. Embodiments pertain to a method and apparatus for modulating light. The apparatus incorporates a modulator crystal having an electro-optic material. The device also has at least two electrode pairs, where each electrode pair that modulates light passing through the modulator crystal that has a direction of travel that has a component parallel to the optic axis.

40 Claims, 2 Drawing Sheets

METHOD AND APPARATUS FOR MODULATING LIGHT

CROSS-REFERENCE TO RELATED APPLICATIONS

This application is the U.S. national stage application of International Patent Application No. PCT/US2009/050417, filed Jul. 13, 2009, which claims the benefit of U.S. Provisional Application Ser. No. 61/080,129, filed Jul. 11, 2008, the disclosures of which are hereby incorporated by reference herein in their entireties, including any figures, tables, or drawings.

The subject invention was made with government support under a research project supported by the National Science Foundation, Contract Numbers PHY-0555453 and PHY-0244902. The government has certain rights to this invention.

BACKGROUND OF INVENTION

Phase and amplitude modulation of light is usually generated by the electro-optic effect, where the index of refraction of a dielectric material is changed by applying a variable external electric field. Typically, a sinusoidal electric field with a fixed frequency is applied across a birefringent electro-optic crystal. This effect can be used to generate phase modulation, amplitude modulation, and/or polarization rotation/variation depending on the polarization state of the incident light and the orientation of the crystal. Current designs typically use one pair of electrodes per modulator material block to apply the electric field, as shown in FIG. 1. The modulator material is commonly made of a transparent, crystalline medium with electro-optic properties, which can be referred to as a modulator crystal. When multiple, e.g., 3, modulation frequencies are required, multiple, e.g., 3, modulators are currently used to provide the multiple frequencies.

Phase modulation of light is often generated by utilization of the electro-optic effect, where the index of refraction of a dielectric material is changed by applying a variable external electric field, typically a sinusoidal voltage at a fixed frequency, applied across the crystal, perpendicular to the direction of travel of the light. The electro-optic effect can also be used to generate amplitude modulation, and/or to rotate the polarization of the incident light, by adjusting the polarization state of the incident light and the orientation of the crystal. The generation of amplitude modulation, when certain orientations of the polarization state of the incident light and the orientation of the crystal occur, makes it hard to achieve pure phase modulation without spurious, unwanted, amplitude modulation or polarization rotation. The modulator material is usually made of a transparent, crystalline medium with electro-optic properties, which can be referred to as a modulator crystal. Current phase modulator designs use crystal front faces that are parallel, as shown in FIG. 1. In the design shown in FIG. 1, both polarizations (x and z) of the incoming beam remain superimposed in the outgoing beam.

BRIEF SUMMARY

Embodiments of the invention can utilize multiple pairs of electrodes sequentially positioned on a single modulator crystal, as shown in FIG. 2. Embodiments utilizing multiple electrode pairs on a single modulator crystal can reduce the number of optical surfaces per modulation frequency when multiple modulation frequencies need to be applied to a light field. In applications where low optical losses are important, keeping the number of optical surfaces low can reduce the overall losses.

Embodiments of the invention can use a wedged modulator crystal made from a birefringent electro-optic material that acts as a polarizer to separate the incident light into light with the polarizations collinear with the x- or z-axis of the modulator crystal, as shown in FIG. 3. Further embodiments can utilize a modulator crystal with one or the other front faces having a normal that makes an angle with respect to the optic axis (e.g., y-axis) of the crystal, such that the opposing front faces are not parallel. A birefringent material with different values for the index of refraction for the x- and z-axis of the crystal allows the separation of the incident light into the polarizations collinear with the x- or z-axis of the modulator crystal. Materials that can be used with embodiments of the subject invention include, but are not limited to, rubidium titanyl phosphate ($RbTiOPO_4$ or RTP), rubidium titanyl arsenate ($RbTiOAsaO_4$ or RTA), and lithium niobate ($LiNbO_3$).

Further embodiments can incorporate at least two electrode pairs with a birefringent electro-optic modulator crystal having at least one face front having a normal that makes an angle with respect to the optic axis (e.g., y-axis) of the crystal, such that the face fronts are not parallel. A specific embodiment can merge the features shown in FIGS. 2 and 3.

DETAILED DISCLOSURE

Embodiments pertain to a method and apparatus for modulating light. The apparatus incorporates a modulator crystal having a electro-optic material. The modulator crystal has an optic axis, a first polarization axis, and a second polarization axis, where the first polarization axis and the second polarization axis are each perpendicular to the optic axis and perpendicular to each other. The device also has at least two electrode pairs, where each electrode pair is positioned such that when a voltage is applied across the electrode pair an electric field is created through a portion of the modulation crystal. The electric field has at least a component perpendicular to the optic axis that modulates the light. The application of the electric field modulates light passing through the modulator crystal that has a direction of travel that has a component parallel to the optic axis. Preferably, the light travels along the optic axis. In specific embodiments, the electro-optic material is $LiNbO_3$, $RbTiOAsO_4$, or $RbTiOPO_4$.

In specific embodiments, the electric field created by at least one of the at least two electrode pairs is a time-varying electric field having a fixed frequency. The electric field created by at least one of the at least two electrode pairs can be a sinusoidal electric field. In specific embodiments, each of the electric fields from the at least two electrode pairs are at a different frequency. The electric field can phase modulate the light passing through the modulator crystal, amplitude modulate the light passing through the modulator crystal, vary a polarization of the light passing through the modulator crystal, and/or rotate a polarization of the light passing through the modulator crystal.

In specific embodiments, at least one of the electric fields from the at least two electrode pairs has a component parallel to the first polarization axis. In specific embodiments, the modulator crystal can have a front surface for receiving light that is to pass through the modulator crystal, where the front surface lies in a plane that is perpendicular to the optic axis.

The at least two electrode pairs can have 3 to 4 electrode pairs, 3 to 16 electrode pairs, 3 to 32 electrode pairs, and/or 3 to 64 electrode pairs. In specific embodiments, two or more of the at least two electrode pairs can share a common ground electrode and/or the electrode can use interdigitated electrode portions as known in the art. The electric field alters the wavelength of the light passing through the modulator crystal for light having a polarization component in the direction of the electric field.

In specific embodiments, electrodes of the at least two electrode pairs are positioned in parallel planes that are parallel to the optic axis.

Figure 1:
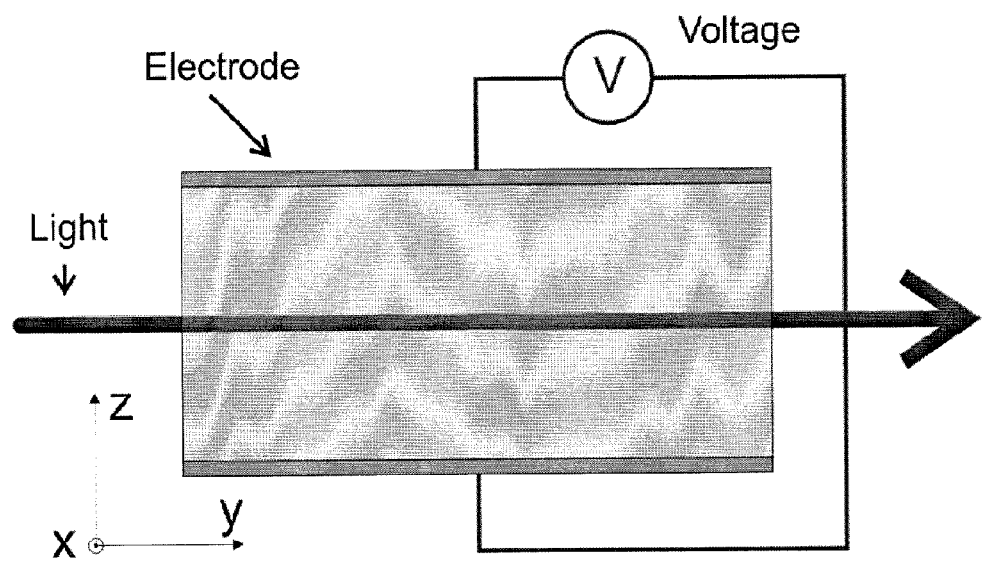
FIG. 1 shows a conventional modulator.
Figure 2:
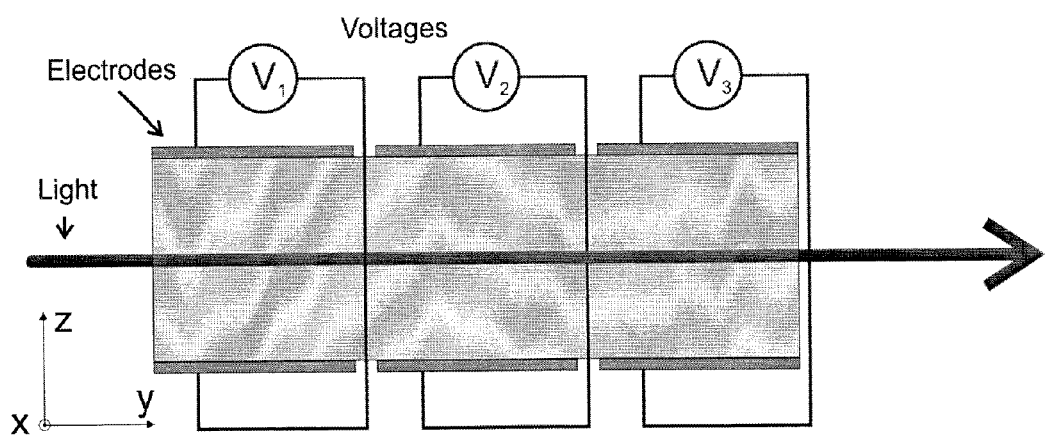
FIG. 2 shows a three electrode pair modulator in accordance with an embodiment of the subject invention.

Embodiments of the invention can utilize multiple pairs of electrodes sequentially positioned on a single modulator crystal, as shown in FIG. 2. Embodiments utilizing multiple electrode pairs on a single modulator crystal can reduce the number of optical surfaces per modulation frequency when multiple modulation frequencies need to be applied to a light field. In applications where low optical losses are important, keeping the number of optical surfaces low can reduce the overall losses.

The use of multiple electrode pairs on a single modulator crystal allows the application of multiple modulations using only one crystal, thus reducing surface reflections and, therefore, optical losses, as compared to the use of multiple separate modulators for each modulation applied. The use of multiple electrode pairs on a single modulator crystal can also reduce the number of required modulator crystals, crystal housings, and optical mounts for the housings. As these components can be expensive, overall cost required to generate multiple modulation frequencies can be reduced.

Specific embodiment relate to a method and apparatus for producing polarized light, having a modulator crystal, where the modulator crystal incorporates a birefringent electro-optic material. The modulator crystal has an optic axis, a first polarization axis, and a second polarization axis, where the first polarization axis and second polarization axis are each perpendicular to the optic axis and perpendicular to each other. Light can enter a first end of the modulator crystal at a first surface and exits a second end of the modulator crystal at a second surface, where the first surface of the first end lies in a first plane and the second surface of the second end lies in a second plane, where the first plane and the second place are not parallel. The apparatus can also include an electrode pair, where the electrode pair is positioned such that when a voltage is applied across the electrode pair an electric field is created through a portion of the modulation crystal. The electric field can have at least a component perpendicular to the optic axis, where application of the electric field creates a difference in a first index of refraction for light polarized along the first polarization axis so as to modulate light passing through the modulator crystal that is polarized along the first polarization axis. When light is incident on the first end, passes through the modulator crystal, and exits the second end, the light is split into a first beam that is polarized along the first axis of polarization and a second beam that is polarized along the second axis of polarization as the light exits the second end, where the first beam and the second beam diverge from each other as the light exits the second end. By diverging, the beams can be separated after leaving the second end of the device. In specific embodiments, after traveling 10 meters from the second end the first beam and second are sufficiently separated from each other that amplitude modulation from the superposition of the first beam and the second beam is strongly reduced or eliminated. In specific embodiments, after traveling 1 meters from the second end the first beam and second are sufficiently separated from each other that amplitude modulation from the superposition of the first beam and the second beam is strongly reduced or eliminated. In specific embodiments, the birefringent electro-optic material can be $RbTiOAsO_4$, $LiNbO_3$, or $RbTiOPO_4$.

In specific embodiments, the first plane makes a first angle with respect to a normal plane that is normal to the optic axis. In specific embodiments, the second plane makes a second angle with respect to a normal plane that is normal to the optic axis. In specific embodiments, the first plane makes a first angle with respect to a normal plane that is normal to the optic axis and the second plane makes a second angle with respect to the normal plane. The second angle can have a second magnitude that is the same as a first magnitude of the first angle or different. The first angle can have an opposite orientation to the optic axis as the second angle or the same. The first plane can makes a first additional angle with an additional normal plane that is normal to the first polarization axis, wherein the first plane is parallel to the second polarization axis. The first polarization axis is preferably the axis of light polarization having the largest index of refraction. The second plane can also make a second additional angle with an additional normal plane that is normal to the first polarization axis, where the second plane is parallel to the second polarization axis. In specific embodiments, the first plane makes a first additional angle with an additional normal plane that is normal to the first polarization axis, the first plane is parallel to the second polarization axis, the second plane makes a second additional angle with the additional normal plane, and the second plane is parallel to the second polarization axis. In specific embodiments, the first angle has a first magnitude of at least 1° and/or the second angle has a second magnitude of at least 1°.

A filter can be positioned to block the first beam after the first beam exits the second end and allows the second beam to pass. Other techniques can also be used to isolate the second beam.

In specific embodiments, the electric field created by the electrode pair is a sinusoidal electric field. The application of the electric field can phase modulate the light passing through the modulator crystal, amplitude modulate the light passing through the modulator crystal, vary a polarization of the light passing through the modulator crystal, and/or rotate a polarization of the light passing through the modulator crystal.

Figure 3:
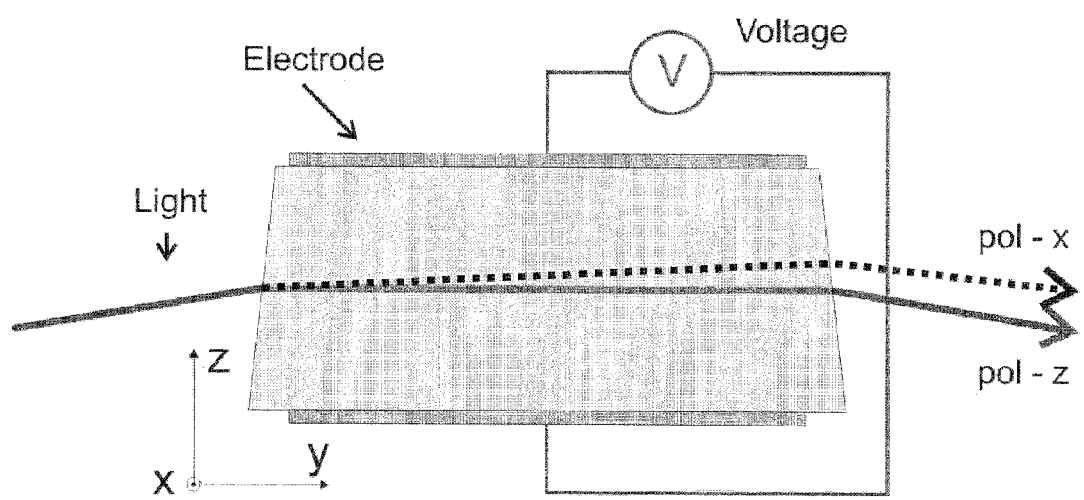
FIG. 3 shows a wedged modulator crystal separating the polarizations in accordance with an embodiment of the subject invention.

Embodiments of the invention can use a wedged modulator crystal made from a birefringent electro-optic material that acts as a polarizer to separate the incident light into light with the polarizations collinear with the x- or z-axis of the modulator crystal, as shown in FIG. 3. Further embodiments can utilize a modulator crystal with one or the other front faces having a normal that makes an angle with respect to the optic axis (e.g., y-axis) of the crystal, such that the opposing front faces are not parallel. A birefringent material with different values for the index of refraction for the x- and z-axis of the crystal allows the separation of the incident light into the polarizations collinear with the x- or z-axis of the modulator crystal. Materials that can be used with embodiments of the subject invention include, but are not limited to, rubidium titanyl phosphate (RbTiOPO$_4$ or RTP), rubidium titanyl arsenate (RbTiOAsO$_4$ or RTA), and lithium niobate (LiNbO$_3$).

RTP is used as the electro-optic crystal in specific embodiments of the invention. RTP has an excellent electro-optic coefficient for light polarized along the z-axis. The index of refraction for the z-axis is n$_z$=1.9. For the x-axis, the index of refraction is n$_x$=1.8.

The two refractive indices lead to different angles of refraction for light incident on the surface at an angle. In the case of the wedged crystal shown in FIG. 3, the incident light is bent towards the normal entering the crystal and bent away from the normal leaving. Both polarizations get a net deflection angle but, because the refractive indices are different, the prism refraction angles are different. Therefore, the two polarizations leave the crystal at different angles. In a specific embodiment, the unwanted x-polarized light is blocked by an aperture behind the modulator.

The device shown in FIG. 3 uses a wedge angle of 2.85 degrees at each front face. Light polarized along the z-axis is deflected by 5.2 degrees whereas the undesirable x-axis polarized light is deflected by 4.7 degrees. Were the two polarizations to proceed together to the detector, they would combine to give modulation of the polarization state, and, hence to give amplitude modulation. The spatial separation allows the removal of one of the two polarized light fields in order to avoid the recombination of the light fields and, therefore, any change of polarization state. The z-axis polarized light can be purely phase modulated and stay as a pure linear polarization. Accordingly, the use of birefringent electro-optic crystals having non-parallel front faces can be used to generate pure phase modulated light.

Embodiments of the subject invention can utilize birefringent electro-optic crystal material, such as rubidium titanyl phosphate (RbTiOPO$_4$ or RTP), rubidium titanyl arsenate (RbTiOAsO$_4$ or RTA), and lithium niobate (LiNbO$_3$). In a specific embodiment, RTP was used as the modulator material.

For a specific embodiment of a modulator using RTP, the crystal dimension is 4×4×40 mm, with the long dimension being aligned to the y-axis of the crystal. The dimensions where chosen to be large enough to accommodate a high power laser beam while keeping the half-wave voltage at a reasonably low level. To avoid the unwanted generation of amplitude modulation by polarization modulation because of imperfect alignment of the incident light and also, to remove etalon interference effects, the faces of the RTP crystal were wedged by 2.85 degrees against the z-axis of the crystal. Other angles can be implemented. Preferably, an angle of at least 1° is used. Preferably, an angle is chosen so that there is no total internal reflection. The birefringence of the RTP material separates the different polarizations by approximately 0.5 degrees, allowing removing of one of the polarized light fields in order to avoid the rotation of the polarization that leads to amplitude modulation. Preferably, the polarized light field to be retained travels parallel to the y-axis of the crystal, which can be achieved by selection of the angle of incidence of the incoming light beam. The crystal faces can be anti-reflection (AR) coated to achieve less than 0.1% remaining reflectivity.

As a way to reduce the optical losses due to remaining surface reflections, the number of modulator crystals can be reduced from three to one with three separate pairs of electrodes creating the three electric fields needed for modulation. This allows the application of three different modulation frequencies. The length of the center electrode can be increased to achieve a stronger modulation depth.

The three electrode pairs can be separately driven with a resonant circuit that is designed to have an input impedance of 50Ω. In a specific embodiment, the modulation frequencies of the modulators are 33.0 MHz, 24.5 MHz, and 61.2 MHz and with a drive power of 24 dBm for each electrode pair the corresponding modulation depths are 0.14, 0.37 and 0.14 generated. The modulations can still be applied sequentially as in the case for discrete modulators.

All patents, patent applications, provisional applications, and publications referred to or cited herein are incorporated by reference in their entirety, including all figures and tables, to the extent they are not inconsistent with the explicit teachings of this specification.

It should be understood that the examples and embodiments described herein are for illustrative purposes only and that various modifications or changes in light thereof will be suggested to persons skilled in the art and are to be included within the spirit and purview of this application.

The invention claimed is:

1. An apparatus for producing polarized light, comprising: a modulator crystal, wherein the modulator crystal comprises a birefringent electro-optic material, wherein the modulator crystal has an optic axis, a first polarization axis, and a second polarization axis, wherein the first polarization axis and second polarization axis are each perpendicular to the optic axis and perpendicular to each other, wherein light enters a first end of the modulator crystal at a first surface and exits a second end of the modulator crystal at a second surface, wherein the first surface of the first end lies in a first plane and the second surface of the second end lies in a second plane, wherein the first plane and the second plane are not parallel, an electrode pair, wherein the electrode pair is positioned such that when a voltage is applied across the electrode pair an electric field is created through a portion of the modulator crystal, wherein the electric field has at least a component perpendicular to the optic axis, wherein application of the electric field creates a difference in a first index of refraction for light polarized along the first polarization axis so as to modulate light passing through the modulator crystal that is polarized along the first polarization axis, wherein when light is incident on the first end, passes through the modulator crystal, and exits the second end, the light is split into a first beam that is polarized along the first axis of polarization and a second beam that is polarized along the second axis of polarization as the light exits the second end, wherein the first beam and the second beam diverge from each other as the light exits the second end.

2. The apparatus according to claim 1, wherein after traveling 10 meters from the second end the first beam and second beam are sufficiently separated from each other that amplitude modulation from the superposition of the first beam and the second beam is strongly reduced or eliminated.

3. The apparatus according to claim 1, wherein after traveling 1 meter from the second end the first beam and second beam are sufficiently separated from each other that amplitude modulation from the superposition of the first beam and the second beam is strongly reduced or eliminated.

4. The apparatus according to claim 1, wherein the birefringent electro-optic material is selected from the group consisting of: RbTiOAsC>$_4$ and LiNbO$_3$.

5. The apparatus according to claim 1, wherein the birefringent electro-optic material is RbTiOPO$_4$.

6. The apparatus according to claim 1, wherein the first plane makes a first angle with respect to a normal plane that is normal to the optic axis.

7. The apparatus according to claim 6, wherein the second plane makes a second angle with respect to the normal plane.

8. The apparatus according to claim 7, wherein the second angle has a second magnitude that is the same as a first magnitude of the first angle, wherein the first angle has an opposite orientation to the optic axis as the second angle.

9. The apparatus according to claim 7, wherein the first plane makes a first additional angle with an additional normal plane that is normal to the first polarization axis, wherein the first plane is parallel to the second polarization axis, wherein the second plane makes a second additional angle with the additional normal plane, wherein the second plane is parallel to the second polarization axis.

10. The apparatus according to claim 6, wherein the first plane makes a first additional angle with an additional normal plane that is normal to the first polarization axis, wherein the first plane is parallel to the second polarization axis.

11. The apparatus according to claim 6, wherein the first angle has a first magnitude of at least 1°.

12. The apparatus according to claim 1, wherein the second plane makes a second angle with respect to a normal plane that is normal to the optic axis.

13. The apparatus according to claim 12, wherein the second plane makes a second additional angle with an additional normal plane that is normal to the first polarization axis, wherein the second plane is parallel to the second polarization axis.

14. The apparatus according to claim 12, wherein the second angle has a second magnitude of at least 1°.

15. The apparatus according to claim 1, further comprising: a filter positioned to block the first beam after the first beam exits the second end and allows the second beam to pass.

16. The apparatus according to claim 1, wherein the electric field created by the electrode pair is a sinusoidal electric field.

17. The apparatus according to claim 1, wherein the application of the electric field phase modulates the light passing through the modulator crystal.

18. The apparatus according to claim 1, wherein the application of the electric field amplitude modulates the light passing through the modulator crystal.

19. The apparatus according to claim 1, wherein the application of the electric field varies a polarization of the light passing through the modulator crystal.

20. The apparatus according to claim 1, wherein the application of the electric field rotates a polarization of the light passing through the modulator crystal.

21. A method for producing polarized light, comprising:
providing a modulator crystal, wherein the modulator crystal comprises a birefringent electro-optic material, wherein the modulator crystal has an optic axis, a first polarization axis, and a second polarization axis, wherein the first polarization axis and second polarization axis are each perpendicular to the optic axis and perpendicular to each other, incidenting light on a first surface of a first end of the modulator crystal such that the light enters the first end of the modulator crystal and exits a second surface of a second end of the modulator crystal, wherein the first surface of the first end lies in a first plane and the second surface of the second end lies in a second plane, wherein the first plane and the second plane are not parallel, providing an electrode pair, wherein the electrode pair is positioned such that when a voltage is applied across the electrode pair an electric field is created through a portion of the modulator crystal, wherein the electric field has at least a component parallel to the first polarization axis, wherein application of the electric field creates a difference in a first index of refraction for light polarized along the first polarization axis so as to modulate the light passing through the modulator crystal that is polarized along the first polarization axis, wherein the light that is incident on the first end, passes through the modulator crystal, and exits the second end is split into a first beam that is polarized along the first axis of polarization and a second beam that is polarized along the second axis of polarization as the light exits the second end, wherein the first beam and the second beam diverge from each other as the light exits the second end.

22. The method according to claim 21, wherein after traveling 10 meters from the second end the first beam and second beam are sufficiently separated from each other that amplitude modulation from the superposition of the first beam and the second beam is strongly reduced or eliminated.

23. The method according to claim 21, wherein after traveling 1 meter from the second end the first beam and second beam are sufficiently separated from each other that amplitude modulation from the superposition of the first beam and the second beam is strongly reduced or eliminated.

24. The method according to claim 21, wherein the birefringent electro-optic material is selected from the group consisting of: $LiNbO_3$ and $RbTiOAsO_4$.

25. The method according to claim 21, wherein the birefringent electro-optic material is $RbTiOPO_4$.

26. The method according to claim 21, wherein the first plane makes a first angle with respect to a normal plane that is normal to the optic axis.

27. The method according to claim 26, wherein the second plane makes a second angle with respect to the normal plane.

28. The method according to claim 27, wherein the second angle has a second magnitude that is the same as a first magnitude of the first angle, wherein the first angle has an opposite orientation to the optic axis as the second angle.

29. The method according to claim 27, wherein the first plane makes a first additional angle with an additional normal plane that is normal to the first polarization axis, wherein the first plane is parallel to the second polarization axis, wherein the second plane makes a second additional angle with the additional normal plane, wherein the second plane is parallel to the second polarization axis.

30. The method according to claim 26, wherein the first plane makes a first additional angle with an additional normal plane that is normal to the first polarization axis, wherein the first plane is parallel to the second polarization axis.

31. The method according to claim 26, wherein the first angle has a first magnitude of at least 1°.

32. The method according to claim 21, wherein the second plane makes a second angle with respect to a normal plane that is normal to the optic axis.

33. The method according to claim 32, wherein the second plane makes a second additional angle with an additional normal plane that is normal to the first polarization axis, wherein the second plane is parallel to the second polarization axis.

34. The method according to claim 32, wherein the second angle has a second magnitude of at least 1°.

35. The method according to claim 21, further comprising:
blocking the first beam after the first beam exits the second end and allowing the second beam to pass.

36. The method according to claim 21, wherein the electric field created by the electrode pair is a sinusoidal electric field.

37. The method according to claim 21, wherein the application of the electric field phase modulates the light passing through the modulator crystal.

38. The method according to claim 21, wherein the application of the electric field amplitude modulates the light passing through the modulator crystal.

39. The method according to claim 21, wherein the application of the electric field varies a polarization of the light passing through the modulator crystal.

40. The method according to claim 21, wherein the application of the electric field rotates a polarization of the light passing through the modulator crystal.

* * * * *

UNITED STATES PATENT AND TRADEMARK OFFICE
CERTIFICATE OF CORRECTION

PATENT NO. : 8,279,511 B2  
APPLICATION NO. : 12/996695  
DATED : October 2, 2012  
INVENTOR(S) : Volker M. Quetschke et al.

Page 1 of 1

It is certified that error appears in the above-identified patent and that said Letters Patent is hereby corrected as shown below:

Column 2,  
Line 20, (RbTiOAsaO$_4$ or RTA)" should read --RbTiOAsO$_4$ or RTA)--.  
Line 57, "LiNbO$_3$. RbTiOAsO$_4$" should read --LiNbO$_3$, RbTiOAsO$_4$--.

Signed and Sealed this
Twelfth Day of March, 2013

Teresa Stanek Rea
*Acting Director of the United States Patent and Trademark Office*